United States Patent
Lettington et al.

(10) Patent No.: US 9,485,392 B1
(45) Date of Patent: *Nov. 1, 2016

(54) SCANNED IMAGING SYSTEMS

(75) Inventors: Alan Harold Lettington, Worcester (GB); Gregory John Ball, Worcester (GB)

(73) Assignee: QINETIQ LIMITED, Farnborough (GB)

(*) Notice: Subject to any disclaimer, the term of this patent is extended or adjusted under 35 U.S.C. 154(b) by 0 days.

This patent is subject to a terminal disclaimer.

(21) Appl. No.: 06/358,932

(22) Filed: Mar. 15, 1982

(30) Foreign Application Priority Data

Mar. 20, 1981 (GB) ..................................... 8108809
Jun. 23, 1981 (GB) ..................................... 8119047

(51) Int. Cl.
G02B 26/08 (2006.01)
H04N 3/09 (2006.01)
G02B 5/09 (2006.01)

(52) U.S. Cl.
CPC . H04N 3/09 (2013.01); G02B 5/09 (2013.01)

(58) Field of Classification Search
CPC .................................. H04N 3/09; G02B 5/09
USPC ............ 350/6.4, 6.5, 6.6, 6.7, 6.8, 6.9, 6.91; 358/206, 207; 359/201.1; 250/236
See application file for complete search history.

(56) References Cited

U.S. PATENT DOCUMENTS

| | | | | |
|---|---|---|---|---|
| 1,790,491 A * | 1/1931 | Smith | ........................... | 358/206 |
| 2,070,460 A * | 2/1937 | Traub | ............................. | 350/6.9 |
| 3,909,105 A * | 9/1975 | Neiswander et al. | ......... | 350/6.6 |
| 4,030,806 A * | 6/1977 | Goshima et al. | .............. | 350/6.8 |
| 4,066,328 A * | 1/1978 | Paulus et al. | ................. | 358/207 |
| 4,082,417 A * | 4/1978 | Runciman et al. | ............ | 350/6.8 |

FOREIGN PATENT DOCUMENTS

| | | | |
|---|---|---|---|
| EP | 0014548 | * | 6/1980 |
| GB | 0487318 | * | 6/1938 |
| GB | 1419619 | * | 12/1975 |
| GB | 1419940 | * | 12/1975 |

* cited by examiner

*Primary Examiner* — Mark Hellner
(74) *Attorney, Agent, or Firm* — Oliff PLC

(57) ABSTRACT

A scanned imaging system includes a lens system for directing radiation from a scene to be scanned onto external reflecting surfaces of a rotating polygon and onto a detector, the external reflecting surfaces including primary and secondary flat facets which rotate together on a common axis, the lens system including an image space lens system for focusing an image of the scene to be scanned in the vicinity of a primary facet, and further including an optical system for directing radiation from a primary facet to a focus at a point on or adjacent an associated secondary facet and to reflect the radiation from the secondary facet to the detector, the arrangement being such that a beam of radiation is incident on substantially the whole width of a primary facet and sweeps round with that facet as the polygon rotates.

10 Claims, 3 Drawing Sheets

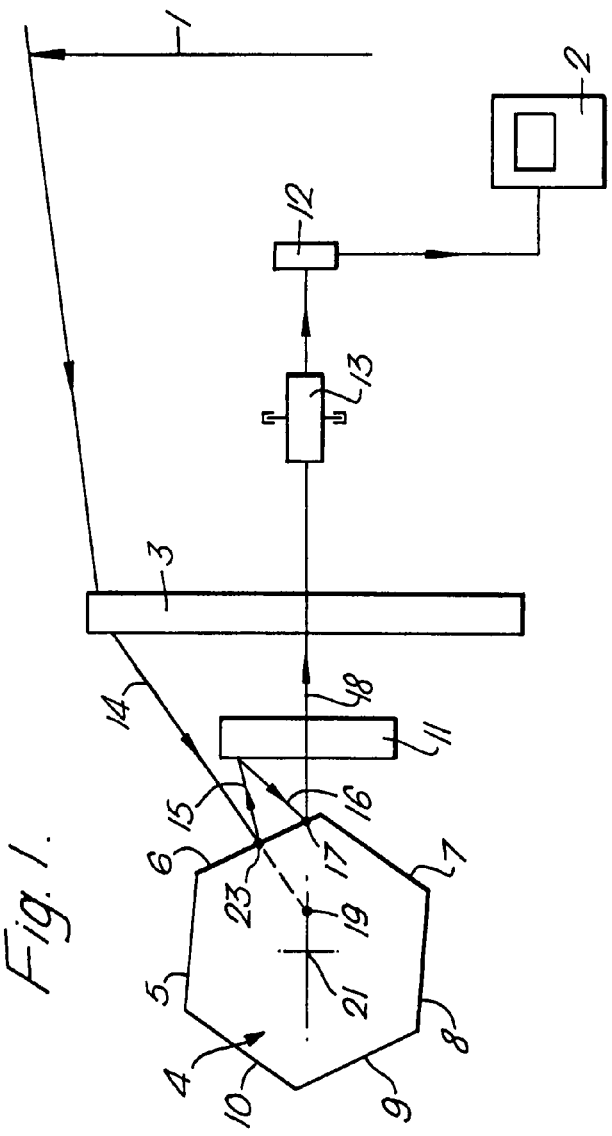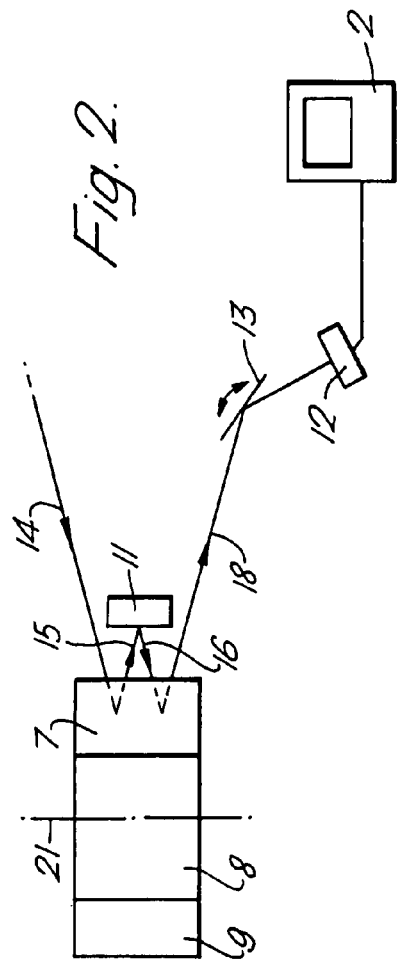

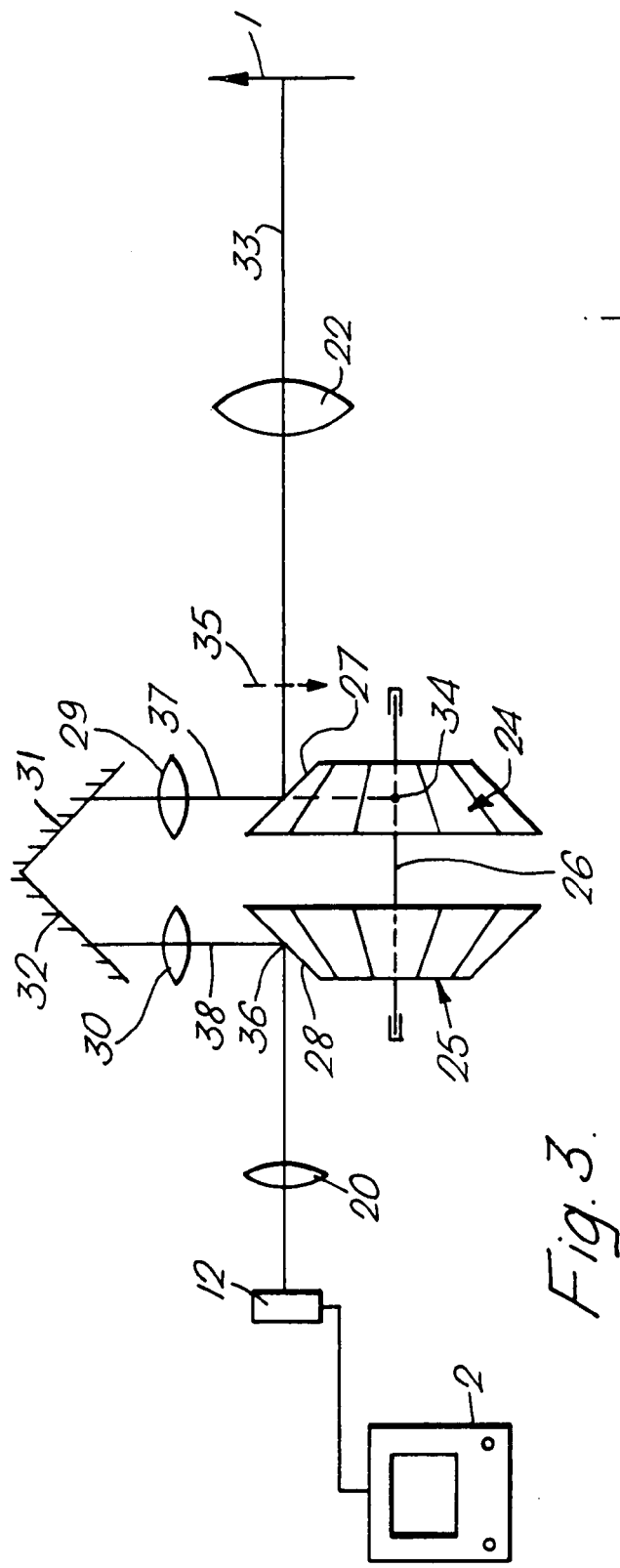
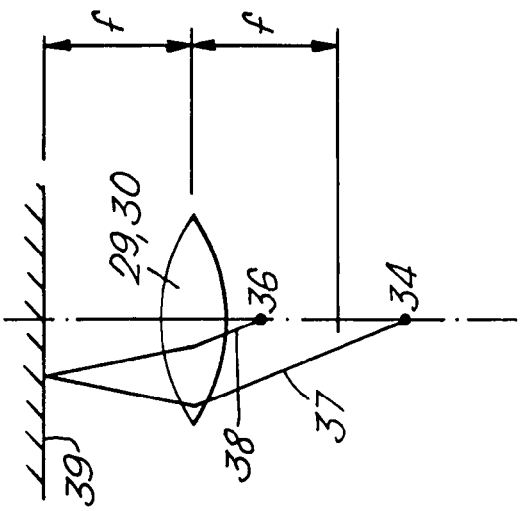
Fig. 3.
Fig. 4.

SCANNED IMAGING SYSTEMS

This invention relates to the improvement of scanning efficiency in mechanically scanned imaging systems incorporating one or more scan mirrors.

Mechanically scanned imaging systems are used to obtain an image of a scene using a comparatively small number of detectors. A linear array of detectors may be scanned across the scene using a single scan mechanism such as a flapping mirror interposed in the optics of the system or the detector array may be scanned in both azimuth and elevation using a rotating polygon with various angled facets or a combination of a rotating polygon with identical facets and a flapping mirror.

The scanning efficiency of a flapping mirror may be reasonably high while that of a rotating polygon operating with parallel or near parallel incident radiation is usually no better than 50% because of the dead time between adjacent facets. The dead time arises because incident light beams are usually stationary whilst a facet is swept across the beam. The time taken for a pool of light to move between adjacent facets is unusable and is known as dead time.

BACKGROUND OF THE INVENTION

A scanning system for reducing dead time is described in G.B. Pat. No. 1,419,940. This system comprises two polygons having the same number of facets and rotating on a common axis. One polygon, a prescanner, has convex facets, while the other or main polygon, has flat facets. Laser light is focussed onto a prescanner facet and reflected off a concave mirror back to a main polygon facet. The beam of light on the main facet occupies the whole width of the facet and sweeps round with it as the main polygon rotates. This system is also suggested for use with a detector replacing the laser to form a flying aperture system.

Other known systems use a double reflection off a rotating polygon; the two reflections may be off different ends of the same facet or the polygon may be split into two with two facets behaving as a single facet rotating together. These known systems suffer from dead time because the region where the incident light reflects off the facet remains substantially stationery while the facet rotates.

Most prior art systems operate in what is known as object space, where an image of the scene being swept is focussed far away from the rotating facets. These use a lens system, such as an afocal telescope, so that the facets operate on parallel or near parallel beams of light.

SUMMARY OF THE INVENTION

The present invention concerns a system which operates in image space where the reflecting facets operate on widely diverging or converging light. An image of the scene is focussed near a facet.

It is an object of this invention to provide an optical and mechanical configuration for a scanning polygon with an improved optical scanning efficiency while maintaining good radiometry at the detector.

According to this invention a scanned imaging system comprises a lens system for directing radiation onto a rotating polygon from where radiation is directed onto a detector or light emitter, characterized by a polygon having flat primary and secondary facets which rotate together, an image space lens system for focussing an image of the scene to be scanned in the vicinity of a facet, and an optical system for directing radiation from a primary facet to its associated secondary facet for reflection to the detector, the arrangement being such that radiation is focussed to a point Amor adjacent to a secondary facet and a beam of radiation incident on substantially the whole width of a primary facet sweeps round with that facet as the polygon rotates.

The primary and second facets may be one and the same, or extensions of one another, or separate from one another, and may be at a non-zero angle to one another. In one form the facets may be at a nominal 45° to their axis of rotation and at 90° to one another. To obtain a banded scan successive facets may be at slightly different angles.

The primary and secondary facets may be of roof prism or reflector form. In one form the primary facets are faces at about 90° facing one another and on successive facet pairs the apex is displaced in a direction parallel to the axis of rotation to give a vertical scan.

The optical system may include at least one lens arranged in front of a mirror which may be a plane mirror or two 90° surfaces forming a roof reflector.

In one form the imaging system is a thermal imaging system incorporating a thermal detector, e.g. a liquid nitrogen cooled detector of the known alloy material cadmium mercury telluride (C.M.T.). Alternatively the detector may be replaced by a modulated light source, e.g. a light emitting diode, so that an image is raster scanned e.g. onto a screen.

Additionally the thermal detector may modulate the light output of the light emitting diode. The light emitting diode light is directed from the secondary and primary facets to an eyepiece for direct viewing of the thermal scene.

BRIEF DESCRIPTION OF THE DRAWINGS

The invention will now be described by way of example only with reference to the accompanying drawings of which:

FIGS. 1 and 2 are diagrammatic plan and side views respectively of a thermal imager system using two similar scanning polygons;

FIG. 3 is a side view of a thermal imager having two 45° polygons;

FIG. 4 is an optical equivalent of part of FIG. 3 to explain its operation; and

DESCRIPTION OF THE PREFERRED EMBODIMENTS

Figure 5:
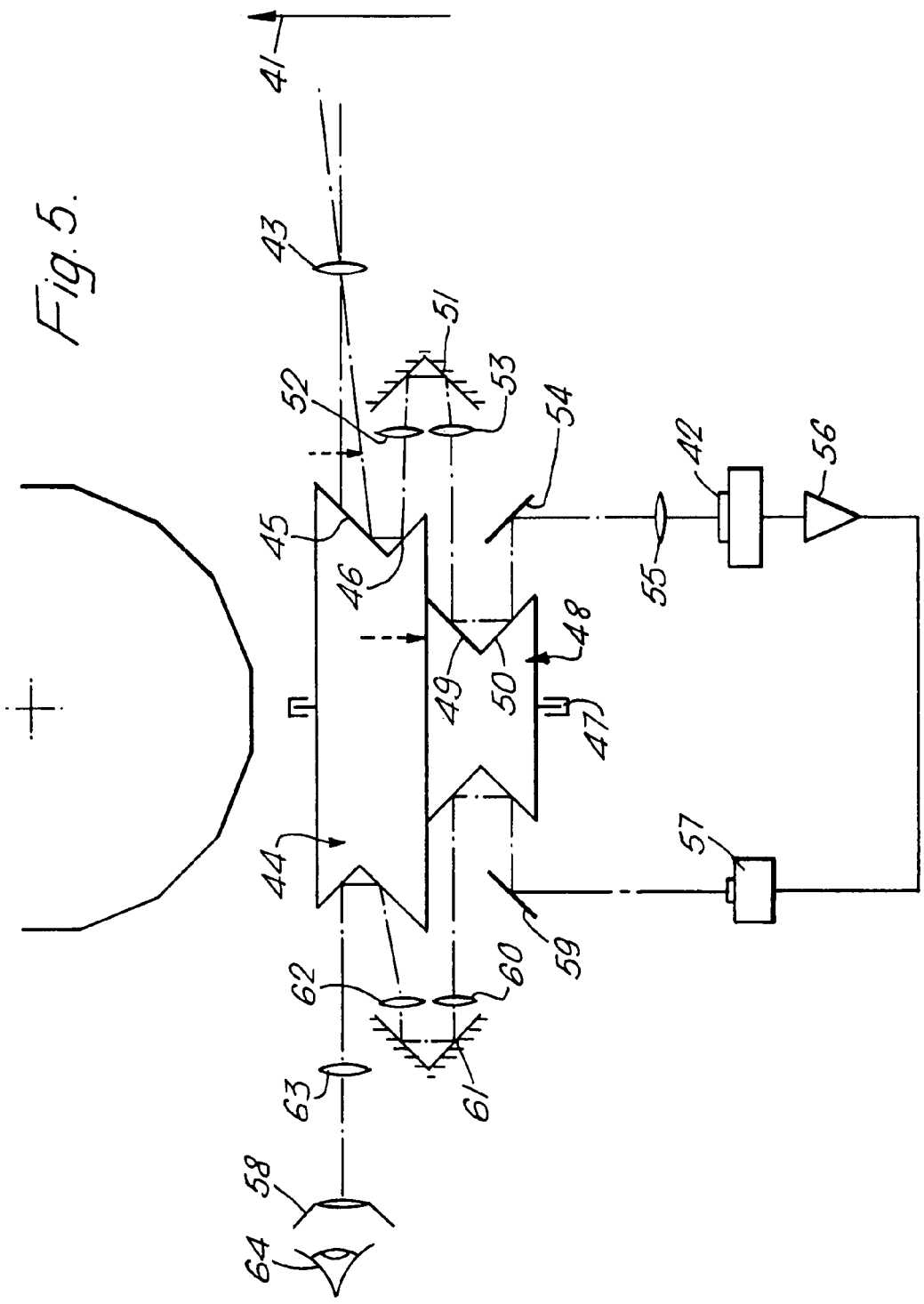
FIG. 5 is diagrammatic side view of another form of thermal imager incorporating a light emitting diode viewer.

As seen in FIGS. 1 and 2 a thermal imager for forming a visible image of a scene 1 on a video monitor 2 comprises an optical component 3, a polygon 4 having plane facets 5 to 10, an optical system 11 and a thermal detector 12 which supplies a signal to the monitor 2. The detector 12 may be a single detector or an array of detectors. A flapping mirror 13 provides a vertical scan. As shown the polygon 4 is a single element but could be two separate but equivalent (i.e. primary and secondary) polygons rotating together.

The radiation 14 originating from the scene 1 is incident at the first polygon 6 at position 23 (i.e. the primary facet) at or near the center of the facet 6 and is arranged to track round with that facet as the scene 1 is scanned. The reflected radiation 15 passes to the optical focussing arrangement 11 where it is directed back along path 16 onto the secondary facet 6 and brought to a focus at or near its surface 17.

The radiation undergoes a further reflection at 17 along direction 18 and is brought to a focus either directly or indirectly at the radiation detector 12. Ideally the efficiency of the scan is controlled by the passage of the next reflecting polygon facet 5 across the cross-section of the beam 18.

To achieve good radiometry at the detector 12 the central ray of the beam 18 which has undergone a second reflection from the scan mechanism should have little or no angular variation as the scanning polygon 4 rotates. This defines the position and direction of the beam 16.

The incident radiation 14 is assumed (for this particular example) to have a pupil at position 19 (inside the polygon 4). On reflection at 23 the radiation appears to have originated beyond the polygon. It is the function of the optical focussing arrangement 11 to relay the first reflected beam 15 along the required path 16.

In practice the beams would be controlled by an aperture stop somewhere within the optics, most probably near the detector 12, and a degree of pupil wander would be tolerated elsewhere within the system.

With identical facets on the polygons the system achieves a one dimensional scan (i.e. single line scan). A flapping mirror 13 is required for vertical scanning or a further polygon used. Alternatively with facets 5-10 variously inclined to the axis of rotation 21 a two dimensional banded scan may be achieved.

For good optical performance the image of the scene at the detector would have to be in focus and free from significant aberrations throughout the scan.

A further FIG. 3 shows a particular optical and mechanical configuration which has high scan efficiency, good optical performance, and is insensitive to lateral displacement of the polygon pair along their axis of rotation.

The imager of FIG. 3 assumes a pupil at infinity (long focal length objective lens). The optical focussing arrangement may however with suitable adjustment accommodate an arbitrarily positioned pupil.

The scanner of FIG. 3 comprises an objective lens 22 which directs radiation 33 from a scene 1 onto a scanning arrangement and thence via a detector lens 20 to a detector or detector array 12. In this case the scanning is performed by a primary 24 and a secondary polygon 25 mounted on a common axis 26 for rotation together. These polygons 24, 25 are identical and have their twelve facets 27, 28 inclined at 45° to the axis 26. Above each polygon 24, 25 is an identical lens 29, 30 and above them a 90° roof mirror pair 31, 32.

In this configuration with the pupil at infinity and the center of the incident beam 33 parallel to the common axis 26 of rotation, reflected radiation from facet 27 appears to arise from a region 34 near the common axis of rotation and is a reflection of the image position 35. The function of the lenses 29, 30 and mirrors 31, 32 is to relay an image at the axis of rotation of the primary polygon 24 to a position 36 close to the face 28 of the secondary polygon 25.

The central ray of beam 37 arriving at the lenses 29, 30 and mirrors 31, 32 and the beam 38 leaving them must lie in planes parallel to one another and the axis 26 to achieve good radiometry, since the entrance pupil is at infinity.

In the arrangement of lenses 29, 30 and mirrors 31, 33 an image at 34 is relayed to an image at 36 with unit magnification.

An example of this optical arrangement is illustrated in FIG. 4. In FIG. 3 in the plane perpendicular to the axis of rotation 26, the mirrors 31 and 32 are equivalent to a single plane mirror at the line of intersection of 31 and 32. This equivalent mirror is shown as 39 in FIG. 4. The two lenses of FIG. 3 are shown as a single lens in FIG. 4. The optical separation between lens 29, 30 and mirror 39 is equal to the focal length f of the lens 29, 30.

An image on the axis 26 at position 34 is re-imaged to the position 36 in FIG. 4, the positions 34 and 36 being spaced either side of the focal point of lens 29, 30. With this optical focussing arrangement the central rays to and from the focal positions 36 and 34 are parallel but displaced as required.

Alternatively if the entrance pupil of the scanner were not at infinity but at a finite position such as an objective aperture then the rays 37 and 38 would not be parallel in FIG. 4. This may be accommodated through altering the optical separation between the lens 29, 30 and the mirror 39 in FIG. 4.

The optical focussing arrangement as shown in FIG. 4 is by means of example only. The lens 29, 30 and mirror plane 39 could be replaced by a mirror or lens-mirror combination so long as it fulfilled the required optical function.

The particular optical focussing arrangement shown in FIG. 3 employs a roof mirror pair 31, 32 whose function is to produce a flat one dimensional scan with the illustrated polygon configuration and enables the scanning mechanism to be insensitive to lateral displacements of the polygon shaft along the axis of rotation 26.

The optical and mechanical configuration shown in FIG. 3 employs separate polygons 24 and 25 and separate lens 29 and 30. The lenses 29, 30, polygons 24, 25 and the pair of mirrors 31 and 32 may be replaced as a unit by single components if required.

The use of the roof mirrors 31 and 32 of FIG. 3 has been described with reference to a particular optical and mechanical arrangement but could however be used in other optical and mechanical arrangements.

The particular optical and mechanical arrangement shown in FIG. 3 is capable of producing a one dimensional scan of a flat image at 35 with little optical distortion when employing appropriately corrected lenses 29 and 30.

The polygon 24, 25 facets have been described as lying at ±45°; this gives a one dimensional scan, which requires an additional polygon pair or a flapping mirror to give a vertical scan. Alternatively or additionally the facets 27, 28 may have different inclinations to give vertical scanning.

As shown in FIG. 5 a thermal image 41 is scanned onto an infra red detector 42. This detector 42 may be of the alloy $Cd_xTe_{1-x}Hg$ as described in U.K. Pat. No. 1,488,258 where the detector has a strip form and thermal radiation is scanned along the strip at a velocity matched to an electrically imposed ambipolar carrier velocity.

The thermal image 41 is directed through a lens 43 onto a primary polygon 44 having 12 similar length sides or facets. Each side is formed by two inwardly directed facets 45, 46 inclined at about 45° to the polygon's axis of rotation 47, i.e. about 90° to one another thus forming a mirror roof pair. The position of the apex between the two facets varies from facet pair to facet pair along the axis to give a vertical scan of the image.

A secondary polygon 48 is fixed co-axially with the primary polygon 44. This secondary polygon 48 also has 12 sides, each side being formed of two inwardly directed facets 49, 50 forming a mirror roof pair. To one side and between the two polygons 44, 48 is a fixed mirror roof prism 51 and two lenses 52, 53 which direct radiation from the primary polygon 44 to the secondary polygon 48. An angled mirror 54 and lens 55 direct radiation from the secondary polygon to the detector 42.

The detector 42 output is amplified by an amplifier 56 and used to modulate the visible light output of a light emitting diode (L.E.D.) 57. Light from the light emitting diode 57 is directed to an eye piece 58 via a path similar to that of incoming infra red (I.R.) radiation, i.e. mirror 59, lens 60, roof mirror 61, and lenses 62, 63.

Each mirror roof pair 45, 46, and 49, 50, reflects as a flat mirror at the apex but with -a displacement along the axis 47. This displacement prevents the various system components e.g. lens 52, 53, mirrors 51, etc., obstructing the rays of radiation. The effect of flat mirror scanning normal to the scene gives a good linear scan.

A thermal image of the scene 41 is incident on the primary facet 45 where it reflects via the primary facet 46, lens 52, mirror pair 51, and lens 53 to focus close to the secondary facets 49, 50. The apparent image position is about half way between the apex of the primary facets 45, 46, and axis 47. From the secondary facet 49 radiation reflects off the secondary facet 50 and mirror 54 to be focussed through the lens 55 onto the detector 42.

As the polygons 44, 48 rotate a different horizontal scan is made of the thermal scene by each facet pair 45, 46, and 49, 50 due to the varying position of the primary facet 45, 46 apex. An advantage of having the primary and secondary facets in the form of roof mirror pairs is the linearity of the horizontal scan and its constant width for all vertical bands.

The detector 42 output modulates the L.E.D. 57 light output. An observer 64, due to retinal persistance, sees a visible image of the thermal image 41 as the L.E.D. is raster scanned across the eye piece 58.

As an alternative to a scanned L.E.D. display the detector output could be used to modulate the scan of a cathode ray tube (C.R.T.) whose screen then presents an image of the thermal scene.

Instead of, or in addition to, vertical scanning by the primary polygon a flapping mirror may be arranged before the detector.

The roof mirror prism may be two mirror surfaces, or a prism reflector, forming a roof reflector.

The invention claimed is:

1. A scanned imaging system comprising a lens system for directing radiation from a scene to be scanned onto external reflecting surfaces of a rotating polygon and onto a detector, said external reflecting surfaces including primary and secondary flat facets which rotate together on a common axis, the lens system including an image space lens system for focusing an image of the scene to be scanned in the vicinity of a primary facet, and further including an optical system for directing radiation from a primary facet to a focus at a point on or adjacent an associated secondary facet and to reflect the radiation from said secondary facet to said detector, the arrangement being such that a beam of radiation is incident on substantially the whole width of a primary facet and sweeps round with that facet as the polygon rotates.

2. The system of claim 1 wherein the primary and secondary facets are outwardly inclined at a nominal 45° to their axis of rotation, the radiation directed towards a primary facet and the radiation reflected from a secondary facet being in a direction along the axis of rotation.

3. The system of claim 2 wherein the optical system comprises a roof reflector and lens.

4. The system of claim 2 wherein successive facets are inclined at slightly different angles to give a banded scan of the image.

5. The system of claim 1 wherein each primary facet is formed by two inwardly directed facets forming a roof mirror which displays incident radiation along the axis of rotation.

6. The system of claim 5 wherein the position of the apex of each pair of inwardly directed facets varies in a direction along the axis of rotation to give a banded scan of the scene.

7. The system of claim 5 wherein each secondary facet is formed by two inwardly directed facets forming a roof mirror pair.

8. The system of claim 5 wherein the optical system comprises a roof reflector and lens operative to direct radiation between primary and secondary facets.

9. The system of claim 7 wherein the distance between the secondary facets and the axis of rotation of the polygon is smaller than the distance between said primary facets and the axis of rotation.

10. The system of claim 1 and further comprising a visible light emitting source whose variable output is controlled by the detector, and an optical arrangement for directing the visible light onto the secondary and primary facets for observation by an observer as an image of the detected scene.

* * * * *